United States Patent Office 3,487,099
Patented Dec. 30, 1969

3,487,099
NOVEL HYDROXYARYL TEREPHTHALAMATES
Claude Breant, Villeurbanne, Hubert Linares, Lyon, and Gerard Seibold, Boulogne-sur-Seine, France, assignors to Rhone-Poulenc S.A.
No Drawing. Filed Aug. 5, 1966, Ser. No. 570,443
Claims priority, application France, Aug. 12, 1965, 28,180; June 14, 1966, 65,449
Int. Cl. C07c 101/72; C08f 45/60
U.S. Cl. 260—471                            6 Claims

ABSTRACT OF THE DISCLOSURE

The invention provides new hydroxyaryl terephthalamates which are useful for stabilizing polyolefins, e.g., polypropylene, against the effects of oxygen.

---

This invention relates to new and useful polyolefin compositions, which are characterized by improved stability against the effects of oxygen, and to the new compositions of matter that enter said polyolefin compositions.

It is known that the problem of stabilization against thermal oxidation is of foremost importance in the case of polyolefins whose conditions of processing in the molten state necessitates elevated temperatures that may reach 350° C. and over an extended period of time. It is also known that this problem is even more important in the case of polyolefins that contain in their molecule tertiary carbon atoms, such as the polymers and copolymers of propylene, 1-butene, the pentenes, methyl pentenes, because these tertiary carbon atoms render them much more sensitive to oxygen degradation than the polyethylenes. It is necessary in this case to employ antioxidants of especially high activity. Furthermore, if these antioxidants are to have lasting activity they have to remain in close and permanent contact with the polymer, first during the period of storing, then during their being formed, and finally in the formed articles themselves. It is known on the other hand that with certain additives to plastics, there occurs in time a migration of these adjuvants toward the surface of the polymer and this may interfere seriously with the desired result.

It has already been proposed to stabilize polyethylene with esters of one β-thiopropionic acid and higher alcohols (French Patent 956,489), but these esters do not provide sufficient protection to polypropylene and other polyolefins and it has been necessary to employ these esters together with other known antioxidants (di-or polyphenols, thiodiphenols); such mixtures exhibit stabilizing properties well above those of each constituent.

Thus, for example, it has recently been postulated in the Japanese application published under No. 13,262/1965 to use, for the stabilization of polypropylene at high temperature, mixtures of lauryl thiodipropionate and derivatives of 4'-hydroxy benzanilide where the latter carries in the non-phenolic ring certain functional groups, i.e. 4-lauryloxy-4'-hydroxy benzanilide and 4-octyloxycarbonyl-4'-hydroxy benzanilide.

We have now found that polymers and copolymers of olefins containing 3 to 10 carbon atoms can be protected against thermal oxygen degradation by adding to them 0 to 3% (by weight) of a diester of thiodipropionic acid with a long chain fatty alcohol and 0.01 to 3% of N-hydroxyaryl terephthalamic acid or ester corresponding to the general formula:

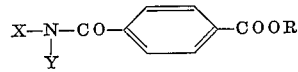

(I)

where X represents a radical HOAr, where Ar is an arylene of one or several rings that may be substituted by one or several hydrocarbon radicals and which carries the OH radical in any desired position in the ring.

Among hydrocarbon radicals the alkyl radicals carrying from 1 to 4 atoms of carbon are particularly suitable, such as methyl, isopropyl, tertiary butyl.

Y represents either a radical HOAr, identical with X, or different, or a monovalent hydrocarbon radical or an hydrogen atom in the case when X is not p. hydroxy phenyl.

R represents an alkyl radical with preferably 1 to 20 carbon atoms or it is hydrogen.

The compositions of matter thus obtained give excellent results when testing their stability by measuring the induction period for oxygen absorption according to the test described below.

The terephthalamic acids and esters corresponding to general Formula I are novel chemical compounds. They are solids, soluble in aliphatic, cycloaliphatic, aromatic and chlorinated solvents, but insoluble in water.

The esters are conveniently prepared by reacting an amino phenol HO—Ar—NHY (where Y has the meaning described before) with the acid chloride of a half ester of terephathalic acid Cl—CO—C$_6$H$_4$—COOR (where R has the meaning described before) or by reacting an amino phenol with a mixed terephthalic ester where one alcohol is a higher fatty alcohol and the other a lower alcohol such as methanol or ethanol. The higher esters of N-hydroxyaryl terephthalamic acid may also be prepared by transesterification of a N-hydroxyaryl terephthalamic ester of a lower alcohol with a higher long chain alcohol, taking care to eliminate the lower alcohol as fast as it is formed.

The processes used for the preparation of the products of Formula I are not limiting and any other known procedure may be used. The acids may be prepared, for instance, from esters by any of the known methods.

While the novel compounds exert by themselves a stabilizing action against oxygen for the polyolefins, they are especially used in conjunction with esters of thiodipropionic acid with which they possess synergistic activity. For an efficient stabilizing activity, from 0.01 to 3% (by weight of polyolefin) of terephthalamic ester and 0.01 to 3% (by weight of polyolefin) of thiodipropionic ester may be added to the polymer. Lauryl thiodipropionate is the preferred thiodipropionic ester. The relative amounts of the additives will vary according to the conditions under which the polymers are subsequently processed and applied.

The stabilizing mixture may be incorporated into the polymer by known mechanical processes (by roll mill or ball mill). In addition, the solid products of Formula I may be incorporated into the polyolefins either as a powdery solid or by impregnation in solution form, choosing such solvents as have no effect upon the polymers.

Several methods have been recommended for the measurement of the activity of antioxidants in polymers. In the special case of the polyolefins, the method described by Hawkins et al., J. Appl. Polym. Sci. 1, No. 1, pp. 37–42 (1959) permits to pinpoint the antioxidants having especially high activity: it cosists of the determination of the resistance of a stabilized polymer, when exposed to an atmosphere of oxygen in a chamber heated to 140° C. It will be noted that at the start of the exposure of the polymer to oxygen, the absorption of oxygen at first is zero or very little, then it increases suddenly rapidly; the activity of the antioxidant is measured by the period when the absorption of oxygen is nil or slow, which period is called the "induction period for oxygen absorption." For this test, the addition of antioxidant to polymer can' be achieved by dry mixing, or preferably by impregnating the polymer with a solution or dispersion of the antioxidant, followed by evaporation of the sovent.

In order to condition the polymer the stabilized powder may be molded directly, with the use of a compression press; in order to insure a still better homogeneity, the stabilized powder may be extruded before molding in the press.

In the latter case, the stabilized polymer is subjected to more vigorous treatment which necessitates temperatures of 200° C. and above, those being the conditions of the best current operating practice.

It should be understood that in the latter case, the conditions of preparing the powder for the test will demand a more active stabilizer than in the former case, because the polymer will have been exposed to air at elevated temperature even before undergoing the test for the measurement of resistance to oxidation.

The stabilized compositions obtained in this manner all give excellent results for stability when measured by the induction period of oxygen absorption. Furthermore, they preserve their mechanical properties under the tests for ageing customarily applied to polymers.

EXAMPLE 1

Preparation of N(4-hydroxy-3,5 di-t. butyl phenyl) terephthalamic acid octadecyl ester (a) Octadecyl terephthalate (II).—Into a 1000 ml. flask provided with a reflux condenser and a dropping funnel there are added 20.3 g. (0.1 mole) terephthaloyl-chloride, 54 g. (0.2 mole) octadecanol and 350 ml. carbon tetrachloride. Into this mixture, under agitation, 21.1 g. (0.2 mole) 2,6-lutidine are dropped in over a period of 10 minutes. The mass is kept at reflux temperature for 2 hours and is then centrifuged hot, and the precipitate of lutidine hydrochloride is washed with 150 ml. carbon tetrachloride at its boiling point. The organic solutions are combined and cooled and the precipitate that forms is filtered off, washed with 150 ml. ether and dried in an oven. Yield is 50 g. of white solid, melting point 84° C., which is octadecyl terephthalate. The yield is 74% of theoretical.

(b) Potassium - octadecyl terephthalate (III).—Following the method described in J. Chem. Soc. 1334 (1963), 10 g. (0.015 mole) of (II) in solution in 100 ml. t. butanol and a solution of potassium hydroxyde 0.015 mole) in 15 ml. water are reacted by refluxing for 3 hours. After cooling the precipitate obtained is washed with absolute alcohol, then with 50% alcohol and dried in vacuo. Yield 4.55 g. of the desired mixed potassium-octadecyl terephthalate which is 67% of theoretical.

(c) 4-octadecyloxy carbonyl benzoylchloride (IV).— Into a 500 ml. reaction flask which contains 29 g. (0.063 mole) of (III) suspended in 150 ml. anhydrous benzene are added 12 g. (0.11 mole) thionylchloride and the mixture is then refluxed for one hour. A precipitate is formed which is centrifuged hot and washed with 3 times 150 ml. hot benzene. After evaporating the combined benzene layers to dryness, there remain 25.8 g. of a solid product, melting point 78° C. which represents the 4-octadecyloxy carbonyl benzoylchloride in a yield of 93%.

(d) N(4-hydroxy-3,5-di-t. butyl phenyl) octadecyl terephthalamate.—Into a 5 liter three necked flask, provided with agitation, dropping funnel and reflux condenser, 188.3 g. (IV) (0.42 mole) are charged together with 1800 ml. anhydrous chloroform. With agitation and applying cooling a solution of 100.6 g. (0.455 mole) 4-amino-2,6-di-t. butyl phenol dissolved in 140 g. 2,6-lutidine are added over a period of 17 minutes and at a temperature of 18–24° C. The mixture is kept at 18–24° C. for 2 hours and then is heated to reflux for one hour. After cooling, the mass is diluted with 500 ml. chloroform, the organic layer is washed 3 times with 300 ml. of 5% aqueous hydrochloric acid, then with 2 times 300 ml. of 5% aqueous sodium hydroxide solution and finally with water to neutrality. The solution of the product is dried over sodium sulfate, remaining chloroform is removed by distillation under vacuum and finally recrystallized from boiling isopropanol (900 ml.). After drying at 60° C. to constant weight, there are obtained 242 g. solid product, melting at 136° C. and identified through infrared spectrography and microanalysis as N(4-hydroxy-3,5-di-t. butyl phenyl) octadecyl terephthalamate in a yield of 92.7%.

EXAMPLE 2

By reacting according to the procedures of Example 1 40 g. (IV) with 10.9 g. 2-aminophenol in solution with 250 ml. carbontetrachloride and in the presence of 10 g. 2.6-lutidine, there are obtained 30 g. of a solid product, melting point 130° C., identified by microanalysis and infrared spectrography as N(2-hydroxy phenyl) octadecyl terephthalamate.

EXAMPLE 3

(IV) is reacted with 2-amino-4-t. butyl phenol, prepared according to the method described by Nikolenko, J. of Gen. Chem. U.S.S.R., 30, 1366 (1960), the solvent being carbontetrachloride. N(2 - hydroxy - 5 - t. butyl phenyl) octadecyl terephthalamate, melting point 108° C.

EXAMPLE 4

By reacting (IV) with bis(4-hydroxy-3,5-di-t. butyl phenyl) amine in a chloroform medium and in the presence of 2,6-lutidine, there is obtained under the same conditions as in the previous examples, N,N-bis(4-hydroxy-3,5-di-t. butyl phenyl) octadecyl terephthalamate, a solid with melting point 85° C.

EXAMPLE 5

N(3-hydroxy-4-methyl phenyl) octadecyl terephthalamate. Under the conditions of the previous example 32.8 g. (IV) (0.075 mole) are reacted with 9.5 g. (0.077 mole) 4-amino-2-hydroxy toluene in 200 ml. carbon tetrachloride. 14.2 g. of a white solid, melting point 167° C. are obtained, identified by microanalysis and infrared spectrography as the above compound.

EXAMPLE 6

The stabilizing action of various stabilizers for polypropylene is investigated by the measurement of the oxygen induction period according the method by Hawkins cited above. To the polypropylene there is added 0.3% of its weight of stabilizer under study, and optionally also 0.3% lauryl thiodipropionate. Two samples are prepared: one is obtained by impregnating the polypropylene with the proper amount of a 1% solution of the stabilizer in chloroform, and afterwards evaporating the solvent. The other sample is stabilized in the same manner and is then extruded at 200° C. and cut into pieces. From these two samples by forming at 200° C., films are prepared of 0.2 mm. thickness. Sample strips of 50 by 5 mm. are cut from these films. The tests for resistance to oxidation are carried out in a chamber with temperature control at 150° C. under a molecular oxygen atmosphere according to the procedure of Hawkins. For each sample a curve is constructed indicating the amount of oxygen absorbed per gram of stabilized polymer, as a function of time in hours. The abscissa of the point corresponding to a rapid increase in the slope measures the induction period for oxygen absorption at 150° C. It should be mentioned that the experiments were conducted at a temperature higher than Hawkins (150° C. instead of 140° C.) in order to decrease the length of the tests.

The following table represents the findings obtained, (a) representing samples of polymer not having undergone a compression operation and (b) representing polymers with prior extrusion.

| Stabilizing agent, 0.3% | Lauryl thio di-propionate, percent | Induction Period (hours) | |
|---|---|---|---|
| | | (a) | (b) |
| None | 0 | 0 | 0 |
| Do | 0.3 | 1 | 0 |
| N(4-hydroxy-di-3,5-t. butyl phenyl) octadecyl terephthalamate | 0 | 115 | 103 |
| Do | 0.3 | 345 | 363 |
| N(2-hydroxy-5-t. butyl phenyl) octadecyl terephthalamate | 0 | 48 | 43 |
| Do | 0.3 | 510 | 340 |
| N(2-hydroxy phenyl) octadecyl terephthalamate | 0 | 38 | 7 |
| Do | 0.3 | 519 | 408 |
| N,N-bis(4-hydroxy-3,5-di-t. butyl phenyl)octadecyl terephthalamate | 0 | 72 | |
| Do | 0.3 | 200 | |

Those skilled in the art will readily appreciate that several modifications in the chemical composition and application of the novel compounds can be made without departing from the spirt of our invention which is limited only by the scope of the appended claims.

What is claimed is:

1. A hydroxyaryl terephthalamate of the formula:

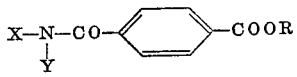

where X is 2-, 3- or 4-hydroxyphenyl either unsubstituted or substituted by up to two alkyl radicals of 1 to 4 carbon atoms each, Y is the same as X, or, when X is not p-hydroxyphenyl, is hydrogen, R is alkyl of 1 to 20 carbon atoms.

2. A hydroxyaryl terephthalamate according to claim 1 which is octadecyl N-(4-hydroxy-3,5-di-t-butylphenyl) terephthalamate.

3. A hydroxyaryl terephthalamate according to claim 1 which is octadecyl N - (2 - hydroxyphenyl)terephthalamate.

4. A hydroxyaryl terephthalamate according to claim 1 which is octadecyl N-(2-hydroxy-5-t-butylphenyl) terephthalamate.

5. A hydroxy terephthalamate according to claim 1 which is octadecyl N,N-bis(4-hydroxy-3,5-di-t-butyl-phenyl)terephthalamate.

6. A hydroxyaryl terephthalamate according to claim 1 which is octadecyl N-(3-hydroxy-4-methylphenyl) terephthalamate.

References Cited

UNITED STATES PATENTS 3,314,989    4/1967    Matterson et al. _____ 260—518

LORRAINE A. WEINBERGER, Primary Examiner

L. A. THAXTON, Assistant Examiner

U.S. Cl. X.R.

260—45.85, 519